United States Patent
Mwaura et al.

(10) Patent No.: US 10,372,935 B1
(45) Date of Patent: Aug. 6, 2019

(54) SELECTIVELY ENCRYPTING COMMIT LOG ENTRIES

(71) Applicant: Google LLC, Mountain View, CA (US)

(72) Inventors: David Wanyoike Mwaura, Mountain View, CA (US); Dmitry N. Orlov, Castro Valley, CA (US)

(73) Assignee: Google LLC, Mountain View, CA (US)

( * ) Notice: Subject to any disclaimer, the term of this patent is extended or adjusted under 35 U.S.C. 154(b) by 123 days.

(21) Appl. No.: 15/348,254

(22) Filed: Nov. 10, 2016

Related U.S. Application Data (60) Provisional application No. 62/255,322, filed on Nov. 13, 2015.

(51) Int. Cl.
 *G06F 21/62* (2013.01)
 *G06F 11/14* (2006.01)
 *G06F 16/23* (2019.01)

(52) U.S. Cl.
 CPC ...... *G06F 21/6227* (2013.01); *G06F 11/1464* (2013.01); *G06F 16/2379* (2019.01); *G06F 2201/84* (2013.01); *G06F 2221/2107* (2013.01)

(58) Field of Classification Search
 CPC ............ G06F 21/6227; G06F 11/1464; G06F 17/30377; G06F 2201/84; G06F 2221/2107
 USPC ....................................................... 713/165
 See application file for complete search history.

(56) References Cited

U.S. PATENT DOCUMENTS

| | | | | |
|---|---|---|---|---|
| 5,696,967 A | * | 12/1997 | Hayashi | G06F 11/1471 714/20 |
| 6,446,092 B1 | * | 9/2002 | Sutter | G06F 21/6227 |
| 2003/0041063 A1 | * | 2/2003 | Brady | G06Q 10/00 |
| 2003/0163431 A1 | * | 8/2003 | Ginter | G06F 21/10 705/64 |
| 2003/0163433 A1 | * | 8/2003 | Lam | G06Q 10/103 705/71 |

(Continued)

OTHER PUBLICATIONS

Ferretti et al., "Distributed, Concurrent, and Independent Access to Encrypted Cloud Databases", Feb. 2014, vol. 25, No. 2, IEEE Transactions on Parallel and Distributed Systems (Year: 2014).*

(Continued)

*Primary Examiner* — Harunur Rashid
*Assistant Examiner* — Sakinah White Taylor
(74) *Attorney, Agent, or Firm* — Fish & Richardson P.C.

(57) ABSTRACT

Methods and systems for selectively encrypting commit log entries in a distributed database system are described. One example method includes determining that a commit log for a particular server in the distributed database system is to be updated based on a data operation performed on a tablet managed by the server, the tablet including at least a portion of the data from a table in the distributed database system, and wherein the data from the table is stored in multiple tablets; determining that the tablet managed by the particular server is an encrypted tablet; in response to determining that the tablet is an encrypted tablet, generating an encrypted log entry representing the data operation performed on the tablet including an encrypted payload including information representing the data operation and an unencrypted header including information about the encrypted log entry; and updating the commit log to include the encrypted log entry.

20 Claims, 7 Drawing Sheets

(56) References Cited

U.S. PATENT DOCUMENTS

| | | | | |
|---|---|---|---|---|
| 2006/0136735 A1* | 6/2006 | Plotkin | .................... | G06F 21/85 |
| | | | | 713/182 |
| 2010/0185847 A1* | 7/2010 | Shasha | ................ | G06F 11/1004 |
| | | | | 713/150 |
| 2014/0245025 A1* | 8/2014 | Fairless | ................. | G06F 21/602 |
| | | | | 713/189 |
| 2015/0186668 A1* | 7/2015 | Whaley | .................... | G06F 16/16 |
| | | | | 713/156 |
| 2015/0304282 A1* | 10/2015 | Xu | ....................... | H04L 63/0272 |
| | | | | 713/153 |
| 2017/0046234 A1* | 2/2017 | Yang | ................... | G06F 11/1464 |

OTHER PUBLICATIONS

Chang et al. "Bigtable: A Distributed Storage System for Structured Data," To appear in OSDI 2006, 14 pages.

\* cited by examiner

SELECTIVELY ENCRYPTING COMMIT LOG ENTRIES

CROSS REFERENCE TO RELATED APPLICATION

This application claims the benefit of U.S. Application No. 62/255,322, filed Nov. 13, 2015, the contents of which are incorporated by reference.

BACKGROUND

This specification generally relates to selectively encrypting commit log entries in a distributed database system.

In database systems, operations that change data (e.g., writes) may be performed on copies of the data that are stored in a high speed, volatile storage (e.g., random access memory (RAM)). This may be done to improve performance by avoiding accessing slower, persistent storage (e.g., disk) every time data is changed. The database system may keep a record of the operations performed on the data in a log file, and the copies of the data in volatile storage may be written to persistent storage at regular intervals in a process referred to as checkpointing.

SUMMARY

In general, one aspect of the subject matter described in this specification may be embodied in systems, and methods performed by data processing apparatuses that include the actions of determining that a commit log for a particular server in the distributed database system is to be updated based on a data operation performed on a tablet managed by the server, the tablet including at least a portion of the data from a table in the distributed database system, and wherein the data from the table is stored in multiple tablets; determining that the tablet managed by the particular server is an encrypted tablet; in response to determining that the tablet is an encrypted tablet, generating an encrypted log entry representing the data operation performed on the tablet including an encrypted payload including information representing the data operation and an unencrypted header including information about the encrypted log entry; and updating the commit log to include the encrypted log entry.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In a distributed database system, the management of data in a particular database may be distributed across a plurality of servers. In some cases, each server may be assigned particular portions of the data in the database to manage. These individual portions of the database may be referred to as "tablets" or "shards," and may include a portion of the data from a table or tables in the distributed database. When a client requests an operation on particular data in the distributed database (e.g., reading the particular data, writing the particular data, etc.), the tablet (or in some cases tablets) containing the particular data is identified, and the server assigned the tablet is instructed to perform the requested operation of the data in the tablet. Each server may keep a local copy of each tablet in memory or other storage, and perform operations on this copy to improve performance. These changes may be committed to persistent storage at regular intervals (e.g., checkpoints). When each server performs an operation of its copy of the tablet, it may write an entry to a commit log stored in persistent storage with information about the operation performed. In the event the server fails and its copy of the tablet including uncommitted changes to the data is lost (due to the local storage being volatile), the commit log may be used to recover the lost changes to the data. In some cases, operations are written to a commit log before they are applied to the underlying data in order to recover from the situation where a server fails while processing a particular operation.

In some cases, such as where the distributed database includes sensitive information and the distributed database system is publicly accessible, it may be desirable to encrypt the data in the database. In such a case, the tablets in the database may be stored in an encrypted form both in volatile and persistent storage. Because the commit log provides information about operations performed to the data (including inserts of new data) that could allow an attacker to derive at least a portion of the data in the distributed data, the commit log may also be stored in an encrypted form.

In some cases, a particular server may manage both encrypted and unencrypted tablets. In order to avoid encrypting log entries for unencrypted tablets (where such encryption is unnecessary) the server may store unencrypted log entries for these tablets.

The present disclosure describes techniques for selectively encrypting commit log entries in a distributed database system. One example method includes, for a data operation on an encrypted tablet, generating an encrypted log entry representing the data operation performed on the tablet. The encrypted log entry includes an encrypted payload including information representing the data operation and an unencrypted header including information about the encrypted log entry, such as a sequence number indicating the order in which the entries were performed and a database identifier associated with the tablet on which the operations was performed. The unencrypted header may also include a "wrapped" (e.g., encrypted or encoded) key to be used to decrypt the encrypted payload. For a data operation on an unencrypted tablet, the log entry may include an unencrypted header in the same format as a log entry for an encrypted tablet, but the header may not include the wrapped key and the payload may be stored unencrypted.

The present disclosure also describes techniques for performing data recovery in the distributed database system. One example method includes retrieving a commit log for a particular server that manages an encrypted tablet for which data recovery is to be performed. Data recovery may be initiated, for example, in response to a failure of the particular server leading to data loss. The particular server may manage other tablets in addition to the encrypted tablet. In such a case, the log entries in the commit log may be sorted based on sequence numbers and database identifiers in the unencrypted headers. Sorting by the sequence numbers and database identifiers allows operations to be arranged in the order in which they were performed, and grouped based on the databases (and thus the tablets) on which they were performed. After sorting, log entries associated with the database identifier for the encrypted tablet to be recovered are identified. A master tablet is retrieved (e.g., from persistent storage) that represents a committed version of the encrypted tablet for which data recovery is to be performed is retrieved. For each log entry with the database identifier for the encrypted tablet to be recovered, a decoded key corresponding to an encoded key from the unencrypted header of the particular log entry is retrieved used to decrypt the payload of the particular log entry. The data operation represented by the particular log entry is then performed on the retrieved master tablet.

The techniques described herein may provide the following advantages. The unencrypted header allows entries in the log to be sorted without decrypting the payload of the encrypted entries, which may improve performance during data recovery. Further, this log entry format allows log entries for encrypted and unencrypted tablets to be stored in the same commit log. Because a particular server may manage both encrypted and unencrypted tablets, the ability to store the log entries for both in the same log file may simplify the operations of the distributed database system by eliminating the need to maintain multiple commit logs per server.

Figure 1:
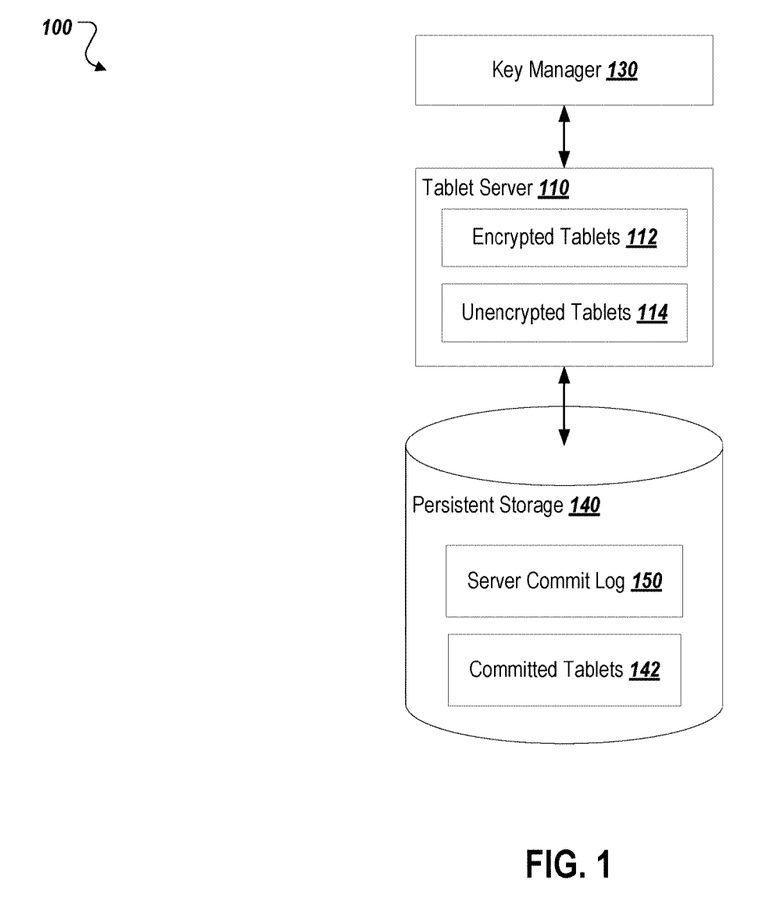
FIG. 1 is a diagram of an example environment for selectively encrypting commit log entries.

FIG. 1 is a diagram of an example environment 100 for selectively encrypting commit log entries. As shown, the environment 100 includes a tablet server 110. A key manager 130, and persistent storage 140. In operation, the tablet server 110 manages encrypted tablets 112 and unencrypted tablets 114. The tablet server 110 process is a request that causes a change to the encrypted to either an encrypted tablet 112 or an unencrypted tablet 114, tablet server 110 writes an entry to the server commit log 150. As described in greater detail below, each entry in the server commit log includes an unencrypted header allowing certain information about the entry to be read regardless of whether the payload of the entry is encrypted. If the entry represents a change to an unencrypted tablet 114, the payload of the entry (which includes details information about the change) is stored in unencrypted form. If the entry represents a change to an encrypted tablet 112, the tablet server 110 retrieves an encryption key from the key manager 130, and encrypts the payload of the entry using this encryption key. A representation of the encryption key is stored in the header of the entry, as described below.

The tablet server 110 may be one of a plurality of servers in a distributed database system. In some implementations, the tablet server 110 may communicate with other servers in the distributed database system over a network. In some implementations, each tablet server 110 may include persistent storage 140, such as a disk or other nonvolatile storage resource. In some cases, the tablet server 110 may use a common storage resource shared with other tablet servers, such as a distributed file system. The tablet server 110 may also include volatile storage, such as random access memory (RAM) or flash memory. The tablet server 110 may use this volatile storage to store the encrypted tablets 112 and the unencrypted tablets 114, and may write changes to the tablets to persistent storage (as committed tablets 142) at regular intervals to improve performance.

The key manager 130 may be a computing device operable to provide encryption keys to the tablet server 110 upon request. In some cases, the key manager 130 provides "wrapped" encryption keys to the tablet server 110. Such wrapped keys are themselves encrypted, and are thus suitable for storage in the unencrypted headers of the commit log entries. This process is described in greater detail below.

Figure 2:
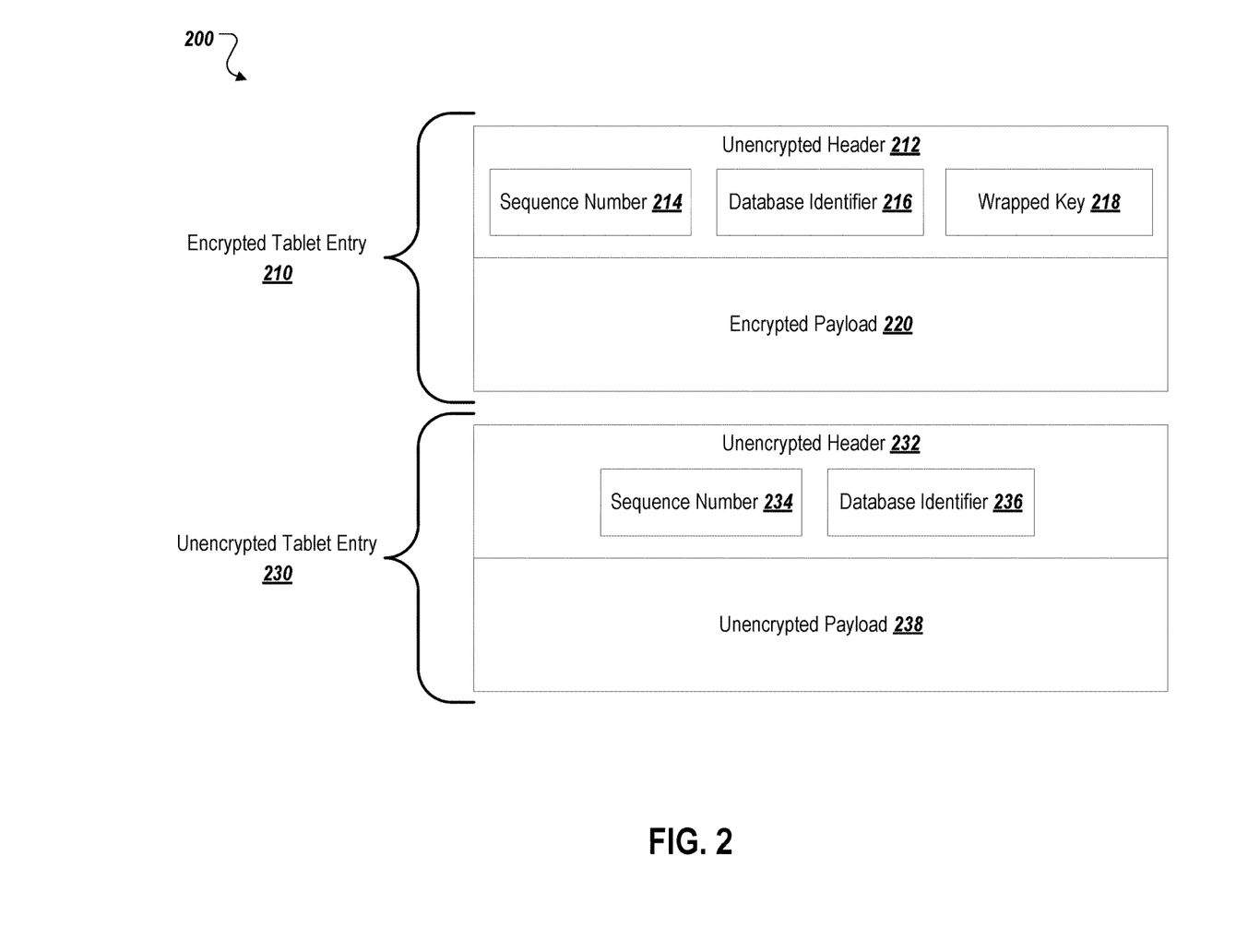
FIG. 2 is a diagram of an example commit including an encrypted entry and an unencrypted entry.

FIG. 2 is a diagram of an example commit log 200 including an encrypted entry 210 and an unencrypted entry 230. As shown, the encrypted tablet entry 210 and the unencrypted tablet entry 230 unencrypted headers 212, 232. Both unencrypted headers 212, 232 include a sequence number 214, 234 indicating in order in which the operation represented by the entry was performed. Both unencrypted headers 212, 232 also include a database identifier 216, 236 indicating a database to which the tablet changed by the operation represented by the entry belongs. The unencrypted header 212 the encrypted tablet entry 210 also includes a wrapped key 218, which is the encryption key received from the key manager 130 discussed above.

Figure 3:
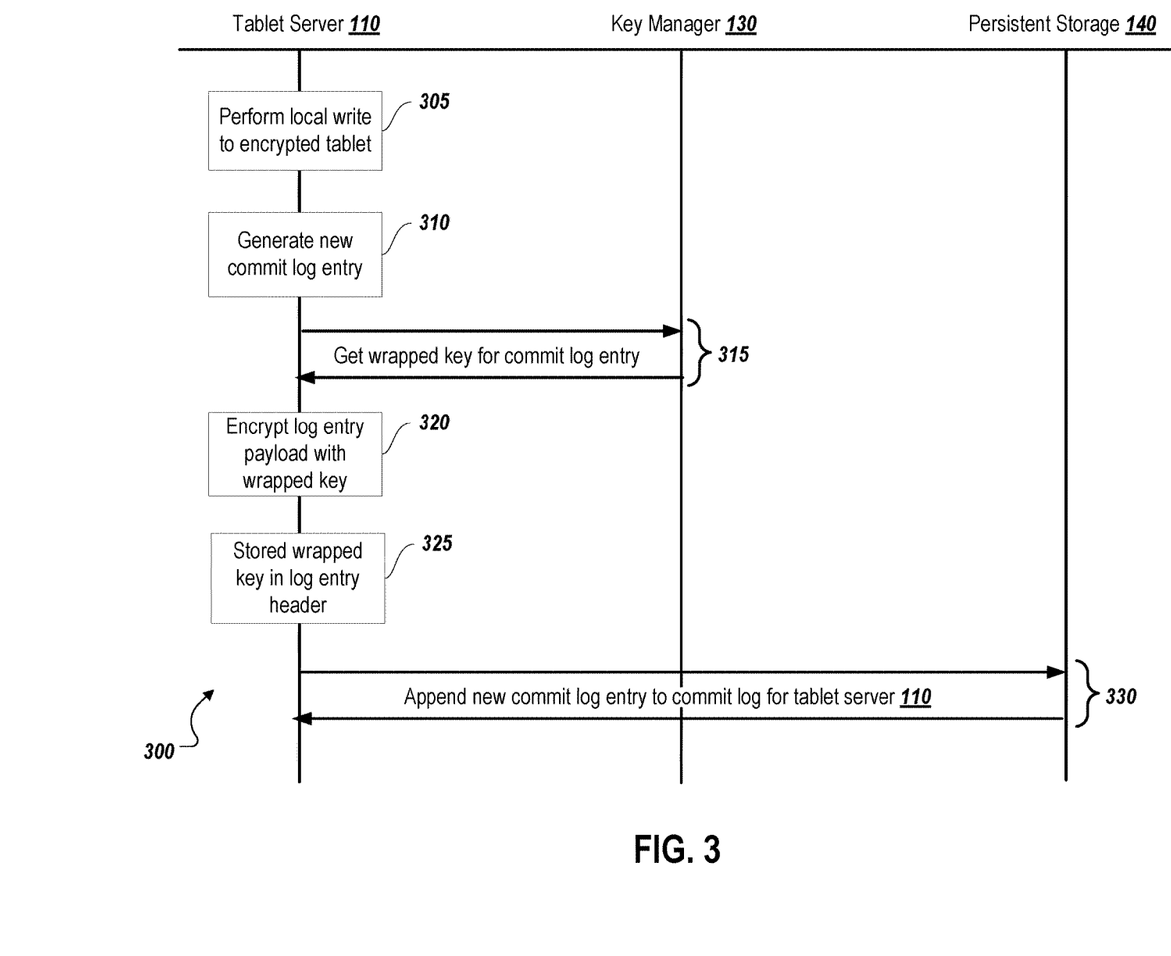
FIG. 3 is a swim lane diagram of an example process for selectively encrypting commit log entries.

FIG. 3 is a swim lane diagram of an example process 300 for selectively encrypting commit log entries. At 305, the tablet server 110 performs a local write to an encrypted tablet. In some cases, this includes the tablet server 110 changing the version of the encrypted tablet in its volatile storage. At 310, the tablet server 110 generates a new commit log entry of the form shown in FIG. 2 representing the change to the encrypted tablet. At 315, the tablet server gets a wrapped key for the new commit log entry from the key manager 130. At 320, the tablet server 110 encrypts the payload for the log entry with the wrapped key received from the key manager 130. At 325, the wrapped keys stored in the commit log entries header, as shown in FIG. 2. At 330, the new commit log entry is appended to the commit log in the persistent storage 140.

Figure 4:
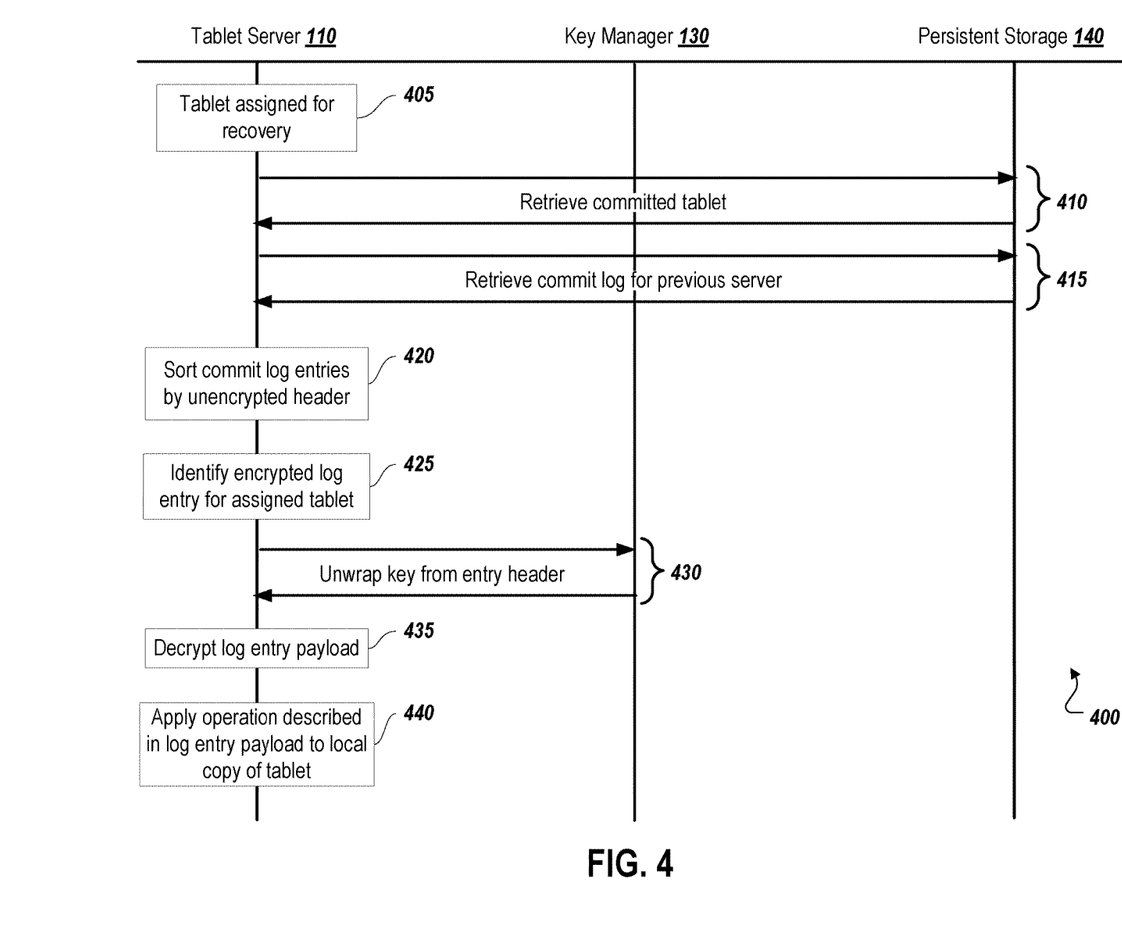
FIG. 4 is a swim lane diagram of an example process of performing tablet recovery based on a commit log including encrypted and unencrypted entries.

FIG. 4 is a swim lane diagram of an example process 400 of performing tablet recovery based on a commit log including encrypted and unencrypted entries. At 405, the tablet server 110 is assigned a tablet during a recovery process. For example, the tablet may have been previously managed by another tablet server that failed. At 410, the tablet server 110 retrieves the committed version of the tablet from the persistent storage 140. In some implementations, the tablet server 110 may retrieve the tablet sign for recovery from another tablet server within the distributed database system that is also assigned to manage the tablet. At 415, the tablet server 110 retrieves the commit log for the server that previously managed the tablet. At 420, the tablet server 110 sorts the entries in the commit log using the unencrypted header. In some implementations, the tablet server 110 a sort the entries by sequence number and database identifier, such that the entries in the commit log are grouped by database and ordered sequentially. At 425, an encrypted log entry in the commit log is identified for the assigned tablet. For example, the tablet server 110 may determine that the commit log entry as a database identifier that matches that of the assigned tablet. At 430, the tablet server 110 retrieves an unwrapped key corresponding to the wrapped key from the commit log entry header. At 435, the tablet server 110 decrypts the log entry payload. At 440, the tablet server 110 applies the operation in the log entry payload to its retrieved copy of the tablet for recovery. During a recovery process, the tablet server 110 may apply the log entries from the commit log sequentially to the committed copy of the tablet to return the tablet to the state it was in the previous servers memory before the failure.

Figure 5:
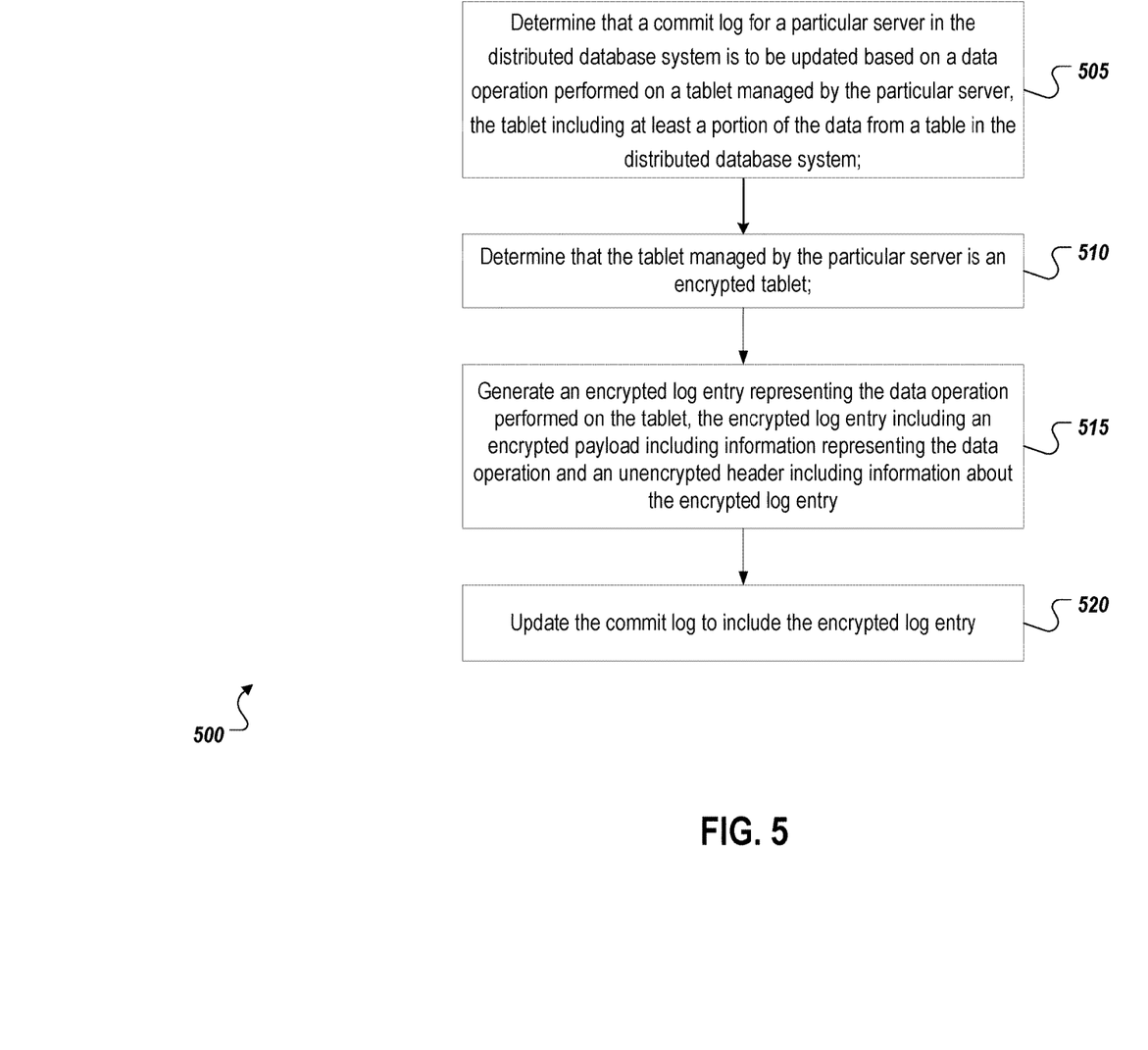
FIG. 5 is a flow chart of an example process for selectively encrypting commit log entries.

FIG. 5 is a flow chart of an example process 500 for selectively encrypting commit log entries. At 505, is determined that a commit log for particular server in the distributed database system is to be updated based on the data operation performed on the tablet managed by the particular server. The tablet includes at least a portion of the data from a table in the distributed database system.

As 510, it is determined that the tablet managed by the particular server is an encrypted tablet.

At 515, an encrypted log entry is generated representing the data operation performed on the tablet. The encrypted log entry may include encrypted payload including information representing the data operation in an unencrypted header including information about the encrypted log entry. In some cases, the unencrypted header includes an encoded key for decrypting the encrypted payload. Generating the encrypted log entry may include receiving the encoded key from a key manager and encrypting the encrypted payload using the encoded key. In some cases, the received encoded key is encrypted using an encryption key associated with the key manager. At 520, the commit log is updated to include the encrypted log entry. In some cases, the commit log includes a plurality of encrypted log entries and a plurality of unencrypted log entries. In some implementations, the unencrypted header for the encrypted log entry and the unencrypted log entry includes a sequence number for the particular log entry and a database identifier associated with the particular tablet on which the data operation represented by the particular log entry was performed.

In some cases, the encrypted log entry is a first encrypted log entry, the encoded key is a first encoded key, the data operation is a first data operation, and the process includes generating a second encrypted log entry representing a second data operation performed on the tablet, the second encrypted log entry including an encrypted payload including information representing the second data operation and an unencrypted header including information about the second encrypted log entry, wherein the unencrypted header of the second encrypted log entry includes a second encoded key different than the first encoded key for decrypting the encrypted payload.

In some implementations, the data operation is a first data operation, the tablet is a first tablet, and the method further comprises: determining that the commit log for the particular server is to be updated based on a second data operation performed on a second tablet managed by the particular server, wherein the second tablet is different than the first tablet; determining that the second tablet managed is an unencrypted tablet; in response to determining that the second tablet is an unencrypted tablet, generating an unencrypted log entry representing the second data operation, the unencrypted log entry including an unencrypted payload including information representing the second data operation and an unencrypted header including information about the unencrypted log entry; and updating the commit log to include the unencrypted log entry. In some cases, the data operation performed on the tablet is performed on a local copy of the tablet stored by the particular server.

Figure 6:
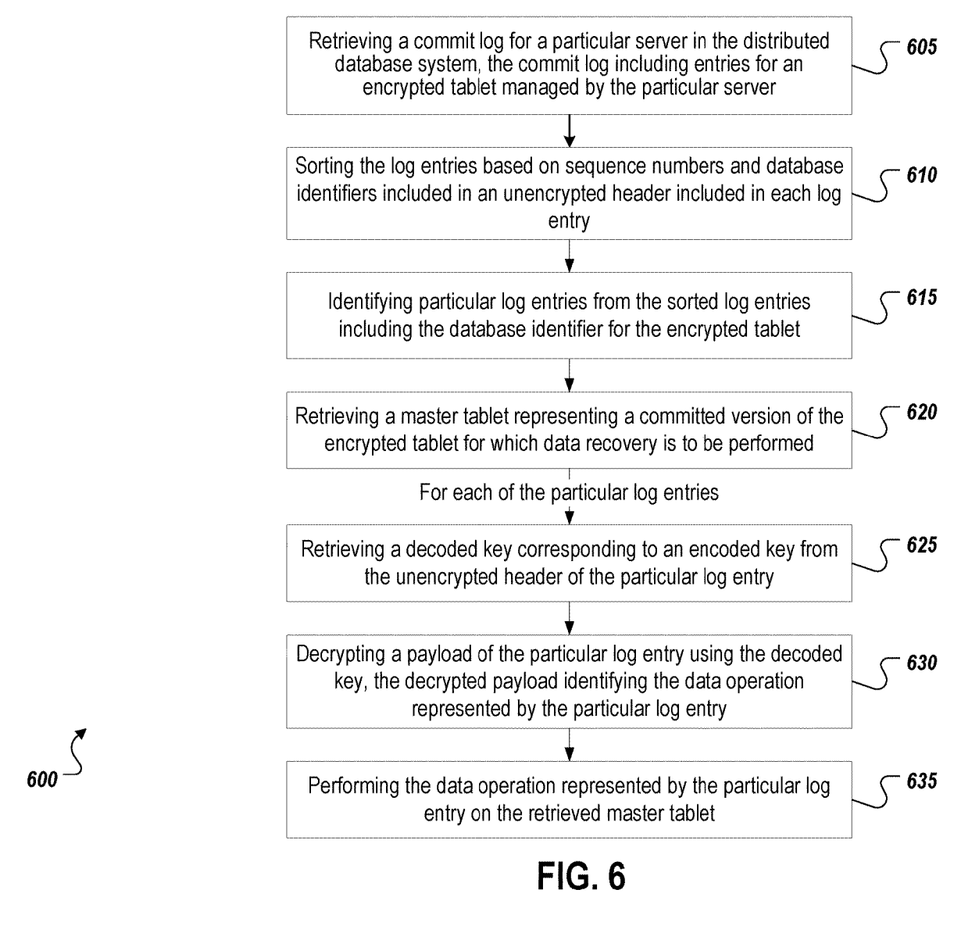
FIG. 6 is a flow chart of an example process of performing tablet recovery based on a commit log including encrypted and unencrypted entries.

FIG. 6 is a flow chart of an example process 600 of performing tablet recovery based on a commit log including encrypted and unencrypted entries. At 605, the commit log is a treat for a particular server in the distributed database system, the commit log including entries for encrypted tablet managed by the particular server.

At 610, the log entries are sorted based on sequence numbers and database identifiers included in an unencrypted header included in each log entry. In some cases, the commit log includes one or more encrypted log entries each including an encrypted payload, and sorting the log entries based on the sequence numbers and the database identifiers included in the unencrypted header included in each log entry is performed without decrypting the encrypted payloads of the one or more encrypted log entries.

At 615 particular log entries are identified from the sorted log entries including the database identifier for the encrypted tablet.

At 620, a master tablet is retrieved representing a committed version of the encrypted tablet for which data recovery is to be performed.

The remaining operations are performed for each of the particular log entries. At 625, a decoded key is retrieved corresponding to an encoded key from the unencrypted header of the particular log entry. In some cases, the encoded key is encrypted using an encryption key associated with a key manager. The decoded key may be retrieved from the key manager. In some cases, before retrieving the commit log, it is determined that data recovery is to be performed on the encrypted tablet based on a failure of the particular server. In some cases, the steps of the method are performed by a server different than the particular server.

Figure 7:
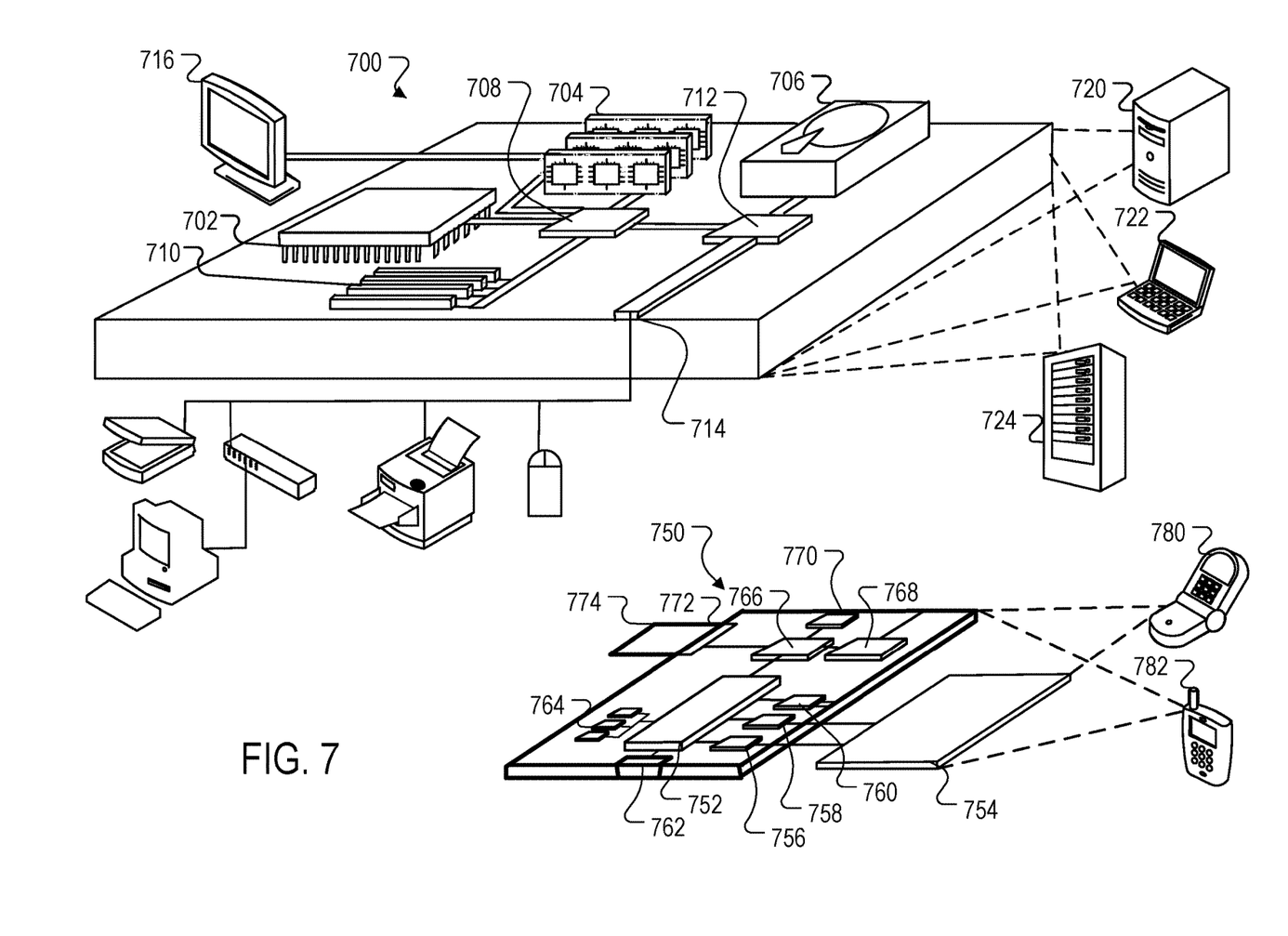
FIG. 7 is a diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 710 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for securely logging data operations in a distributed database system executed by one or more processors, the method comprising:
    determining that a commit log for a particular server in the distributed database system is to be updated based on a data operation performed on a tablet managed by the particular server, the tablet including at least a portion of the data from a table in the distributed database system, and wherein the data from the table is stored in both encrypted tablets and unencrypted tablets;
    in response to determining that the commit log for the particular server in the distributed database system is to be updated based on the data operation performed on the tablet managed by the particular server, determining that the tablet managed by the particular server is an encrypted tablet instead of an unencrypted tablet;
    in response to determining that the tablet is an encrypted tablet instead of an unencrypted tablet, generating an encrypted log entry representing the data operation performed on the tablet, the encrypted log entry including an encrypted payload including information representing the data operation and an unencrypted header including information about the encrypted log entry;
    updating the commit log to include the encrypted log entry;
    determining that the commit log for the particular server is to be updated based on a second data operation performed on a second tablet managed by the particular server;
    in response to determining that the commit log for the particular server is to be updated based on the second data operation performed on the second tablet managed by the particular server, determining that the second tablet managed by the particular server is an unencrypted tablet instead of an encrypted tablet;
    in response to determining that the second tablet is an unencrypted tablet instead of an unencrypted tablet, generating an unencrypted log entry representing the second data operation, the unencrypted log entry including an unencrypted payload including information representing the second data operation and an unencrypted header including information about the unencrypted log entry; and
    updating the commit log to include both the encrypted log entry and the unencrypted log entry.

2. The method of claim 1, wherein the unencrypted header includes an encoded key for decrypting the encrypted payload.

3. The method of claim 2, wherein generating the encrypted log entry includes receiving the encoded key from a key manager and encrypting the encrypted payload using the encoded key.

4. The method of claim 3, wherein the received encoded key is encrypted using an encryption key associated with the key manager.

5. The method of claim 1, wherein the encrypted log entry is a first encrypted log entry, the encoded key is a first encoded key, the data operation is a first data operation, and the method further comprises:
  generating a second encrypted log entry representing a second data operation performed on the tablet, the second encrypted log entry including an encrypted payload including information representing the second data operation and an unencrypted header including information about the second encrypted log entry, wherein the unencrypted header of the second encrypted log entry includes a second encoded key different than the first encoded key for decrypting the encrypted payload.

6. The method of claim 1, wherein the data operation is a first data operation, the tablet is a first tablet, and the method further comprises:
  determining that the commit log for the particular server is to be updated based on a second data operation performed on a second tablet managed by the particular server, wherein the second tablet is different than the first tablet;
  determining that the second tablet managed is an unencrypted tablet;
  in response to determining that the second tablet is an unencrypted tablet, generating an unencrypted log entry representing the second data operation, the unencrypted log entry including an unencrypted payload including information representing the second data operation and an unencrypted header including information about the unencrypted log entry; and
  updating the commit log to include the unencrypted log entry.

7. The method of claim 6, wherein the commit log includes a plurality of encrypted log entries and a plurality of unencrypted log entries.

8. The method of claim 6, wherein the unencrypted header for the encrypted log entry and the unencrypted log entry includes a sequence number for the particular log entry and a database identifier associated with the particular tablet on which the data operation represented by the particular log entry was performed.

9. The method of claim 1, wherein the data operation performed on the tablet is performed on a local copy of the tablet stored by the particular server.

10. The method of claim 1, wherein the encrypted header includes an encoded key and the encrypted payload is encrypted using the encoded key, wherein the encoded key identifies a decoded key that is configured to decrypt the encrypted payload.

11. A system comprising:
  one or more computers and one or more storage devices storing instructions that are operable, when executed by the one or more computers, to cause the one or more computers to perform operations comprising:
  determining that a commit log for a particular server in the distributed database system is to be updated based on a data operation performed on a tablet managed by the particular server, the tablet including at least a portion of the data from a table in the distributed database system, and wherein the data from the table is stored in both encrypted tablets and unencrypted tablets;
  in response to determining that the commit log for the particular server in the distributed database system is to be updated based on the data operation performed on the tablet managed by the particular server, determining that the tablet managed by the particular server is an encrypted tablet instead of an unencrypted tablet;
  in response to determining that the tablet is an encrypted tablet instead of an unencrypted tablet, generating an encrypted log entry representing the data operation performed on the tablet, the encrypted log entry including an encrypted payload including information representing the data operation and an unencrypted header including information about the encrypted log entry;
  updating the commit log to include the encrypted log entry;
  determining that the commit log for the particular server is to be updated based on a second data operation performed on a second tablet managed by the particular server;
  in response to determining that the commit log for the particular server is to be updated based on the second data operation performed on the second tablet managed by the particular server, determining that the second tablet managed by the particular server is an unencrypted tablet instead of an encrypted tablet;
  in response to determining that the second tablet is an unencrypted tablet instead of an unencrypted tablet, generating an unencrypted log entry representing the second data operation, the unencrypted log entry including an unencrypted payload including information representing the second data operation and an unencrypted header including information about the unencrypted log entry; and
  updating the commit log to include both the encrypted log entry and the unencrypted log entry.

12. The system of claim 11, wherein the unencrypted header includes an encoded key for decrypting the encrypted payload.

13. The system of claim 12, wherein generating the encrypted log entry includes receiving the encoded key from a key manager and encrypting the encrypted payload using the encoded key.

14. The system of claim 13, wherein the received encoded key is encrypted using an encryption key associated with the key manager.

15. The system of claim 11, wherein the encrypted log entry is a first encrypted log entry, the encoded key is a first encoded key, the data operation is a first data operation, and the operations further comprise:
  generating a second encrypted log entry representing a second data operation performed on the tablet, the second encrypted log entry including an encrypted payload including information representing the second data operation and an unencrypted header including information about the second encrypted log entry, wherein the unencrypted header of the second encrypted log entry includes a second encoded key different than the first encoded key for decrypting the encrypted payload.

16. A non-transitory computer-readable medium storing software comprising instructions executable by one or more computers which, upon such execution, cause the one or more computers to perform operations comprising:

determining that a commit log for a particular server in the distributed database system is to be updated based on a data operation performed on a tablet managed by the particular server, the tablet including at least a portion of the data from a table in the distributed database system, and wherein the data from the table is stored in both encrypted tablets and unencrypted tablets;

in response to determining that the commit log for the particular server in the distributed database system is to be updated based on the data operation performed on the tablet managed by the particular server, determining that the tablet managed by the particular server is an encrypted tablet instead of an unencrypted tablet;

in response to determining that the tablet is an encrypted tablet instead of an unencrypted tablet, generating an encrypted log entry representing the data operation performed on the tablet, the encrypted log entry including an encrypted payload including information representing the data operation and an unencrypted header including information about the encrypted log entry;

updating the commit log to include the encrypted log entry;

determining that the commit log for the particular server is to be updated based on a second data operation performed on a second tablet managed by the particular server;

in response to determining that the commit log for the particular server is to be updated based on the second data operation performed on the second tablet managed by the particular server, determining that the second tablet managed by the particular server is an unencrypted tablet instead of an encrypted tablet;

in response to determining that the second tablet is an unencrypted tablet instead of an unencrypted tablet, generating an unencrypted log entry representing the second data operation, the unencrypted log entry including an unencrypted payload including information representing the second data operation and an unencrypted header including information about the unencrypted log entry; and     updating the commit log to include both the encrypted log entry and the unencrypted log entry.

17. The medium of claim 16, wherein the unencrypted header includes an encoded key for decrypting the encrypted payload.

18. The medium of claim 17, wherein generating the encrypted log entry includes receiving the encoded key from a key manager and encrypting the encrypted payload using the encoded key.

19. The medium of claim 18, wherein the received encoded key is encrypted using an encryption key associated with the key manager.

20. The medium of claim 16, wherein the encrypted log entry is a first encrypted log entry, the encoded key is a first encoded key, the data operation is a first data operation, and the method further comprises:

generating a second encrypted log entry representing a second data operation performed on the tablet, the second encrypted log entry including an encrypted payload including information representing the second data operation and an unencrypted header including information about the second encrypted log entry, wherein the unencrypted header of the second encrypted log entry includes a second encoded key different than the first encoded key for decrypting the encrypted payload.

\* \* \* \* \*

UNITED STATES PATENT AND TRADEMARK OFFICE
CERTIFICATE OF CORRECTION

| | | |
|---|---|---|
| PATENT NO. | : 10,372,935 B1 | Page 1 of 1 |
| APPLICATION NO. | : 15/348254 | |
| DATED | : August 6, 2019 | |
| INVENTOR(S) | : Mwaura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this
Second Day of June, 2020

Andrei Iancu
*Director of the United States Patent and Trademark Office*